US005724953A

United States Patent [19]

Jung

[11] Patent Number: 5,724,953

[45] Date of Patent: Mar. 10, 1998

[54] INACTIVE STATE DETERMINING METHOD OF OXYGEN SENSOR FOR VEHICLE

[75] Inventor: Hun Jung, Seoul, Rep. of Korea

[73] Assignee: KIA Motors Corporation, Seoul, Rep. of Korea

[21] Appl. No.: 674,237

[22] Filed: Jun. 28, 1996

[30] Foreign Application Priority Data

Apr. 24, 1996 [KR] Rep. of Korea ........................ 96-12707

[51] Int. Cl.[6] ........................... F02D 41/22; G01M 19/00

[52] U.S. Cl. ........................... 123/688; 73/118.1; 204/401

[58] Field of Search ........................................ 123/479, 688; 73/23.32, 118.1; 204/401

[56] References Cited

U.S. PATENT DOCUMENTS 4,980,834 12/1990 Ikeda et al. ........................ 123/688 X
5,423,203 6/1995 Namiki et al. ........................ 123/688 X

*Primary Examiner*—Tony M. Argenbright

[57] ABSTRACT

Disclosed is an inactive-state determining method of an oxygen sensor, including the steps of determining whether the oxygen sensor is in a condition where the oxygen sensor can be activated. It is determined whether an engine is in an idle state. A predetermined time is counted. It is determined whether electromotive force from the oxygen sensor is below a slice level even after the predetermined time is passed. An amount of fuel injected is increased by 20%. It is determined whether the electromotive force of the oxygen sensor is below the slice level even when the increased fuel is injected.

6 Claims, 2 Drawing Sheets

INACTIVE STATE DETERMINING METHOD OF OXYGEN SENSOR FOR VEHICLE

BACKGROUND

The present invention relates to an inactive-state determining method of an oxygen sensor for a vehicle and, more particularly, to an inactive-state determining method which can correctly determine whether the activation of the oxygen is true or not.

An oxygen sensor, which is also called an $O_2$ sensor, is a sensor that detects oxygen in gases in order to improve the purification rate of a three way catalyst, determining whether the stoichiometric ratio is more rich than the air-fuel ratio or not. Although the oxygen sensor is a kind of the air-fuel ratio, it detects only stoichiometric ratio.

Referring to FIG. 1, a zirconia tube 10 is mounted on an exhaust manifold 20 such that the outer side thereof can contact exhaust gas and the inner side thereof can contact ambient air. Since zirconia material inherently generates electromotive force when the temperature is increased, when measuring the voltage at the outer and inner sides of the zirconia tube 10, the voltage is suddenly increased. Accordingly, a zirconia oxygen sensor using this phenomenon has been widely used. However, there is also a titania oxygen sensor which uses high purity titania material.

For example, when the presence of HC and CO in exhaust gas is large, namely, when an air-fuel mixture is in a rich state, HC and CO are burned at the exterior of the oxygen sensor by a catalyst of platinum, removing oxygen on the surface of the platinum. As a result, maximum electromotive force of about 1V is generated on the oxygen sensor.

The ECU controls the injector how much fuel to be injected by the injector in response to electromotive force from the oxygen sensor. For example, when the maximum electromotive force of about 1V is generated, the injector injects a large amount of fuel, and when electromotive force of about 0V is generated, the ECU determines that air is not sufficient to make the injector inject a small amount of fuel, thereby making the mixture to approach to the stoichiometric ratio.

However, when a problem occurs in the circuits of the oxygen sensor and the oxygen sensor is not activated, the fuel system feedback as described above does not operate such that the three-way catalytic converter cannot optimally operate.

In spite of a malfunction in the oxygen sensor, the ECU still assumes that the oxygen sensor in operating normally, thereby still depending on the fuel system feedback. As a result, an exhaust gas mixture ratio from the exhaust manifold makes the exhaust emission harmful to the environment.

Accordingly, the ECU is requested to be programmed so as not to depend on the fuel system feedback but information from an RPM sensor, an air flow meter and a barometric pressure sensor so as to determine the amount of fuel injected by the injector by timely determining whether the oxygen sensor is activated or not.

To meet the request, a method, which determines if the oxygen sensor is activated or not by making the amount of fuel injected by the injector be increased by 15%. However, this method sometimes fails to activate the oxygen sensor according to the characteristics of the zirconia. Therefore, it is not reasonable to determine whether the oxygen sensor is malfunctioning after seeing that the oxygen sensor is not activated even when the fuel is increased by 15%.

SUMMARY

Therefore, the present invention is made in an effort to solve the above described problems.

It is an object of the present invention to provide an inactive-state determining method which can correctly determine whether the activation is true or not.

To achieve the above object, the present invention provides an inactive-state determining method of an oxygen sensor, comprising the steps of:

determining whether the oxygen sensor is in a condition where the oxygen sensor can be activated;

determining whether an engine is in an idle state;

counting a predetermined time;

determining whether electromotive force from the oxygen sensor is below a slice level even after the predetermined time is passed;

injecting an amount of fuel increased by 20%; and determining whether the electromotive force of the oxygen sensor is below the slice level even when the increased fuel is injected.

According to a feature of the present invention, the step of determining whether the oxygen sensor is in a condition where the oxygen sensor can be activated comprises the steps of determining whether the temperature of cooling water of an engine is above a predetermined level, and determining whether an engine RPM is above a predetermined value.

According to another feature of the present invention the predetermined level of the temperature of the cooling water is about 60 degrees.

Preferably, the predetermined level of the engine RPM is about 150 RPM.

Preferably, the counting time is about 90.1 seconds.

The slice level is preferably at about 0.5518V.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DESCRIPTION

A preferred embodiment of the present invention will now be described in detail with reference to the accompanying drawings.

Figure 1:
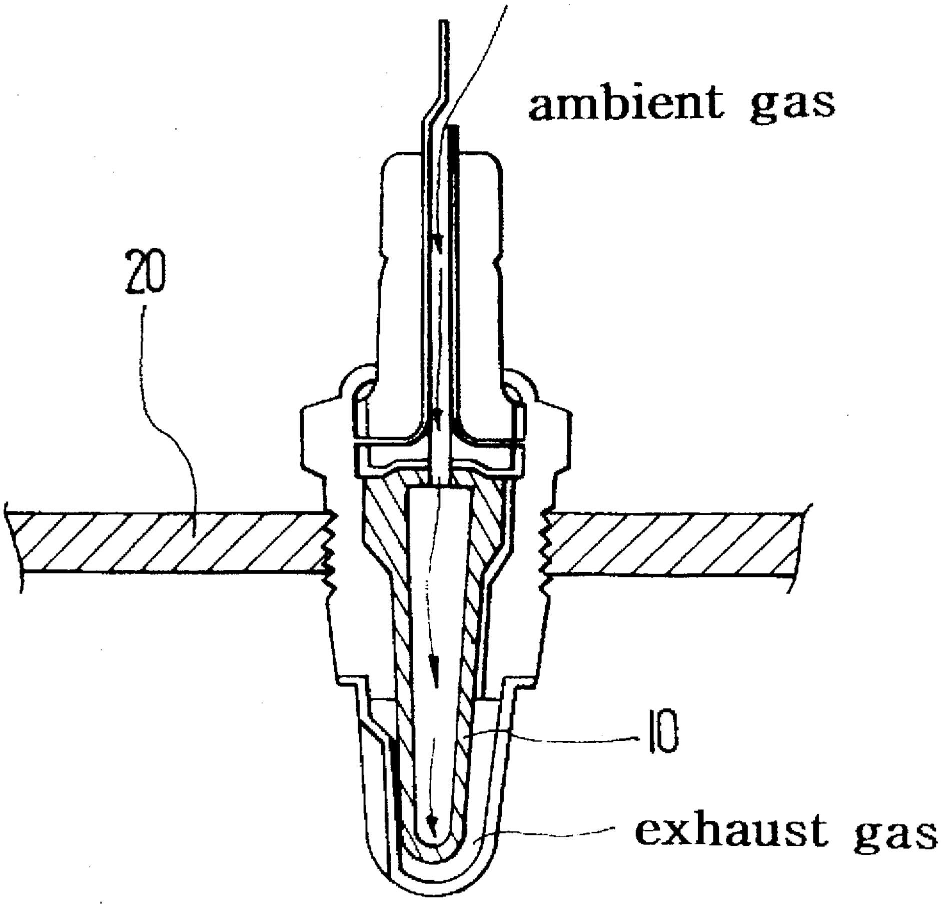
FIG. 1 is a schematic sectional view showing a conventional oxygen sensor.
Figure 2:
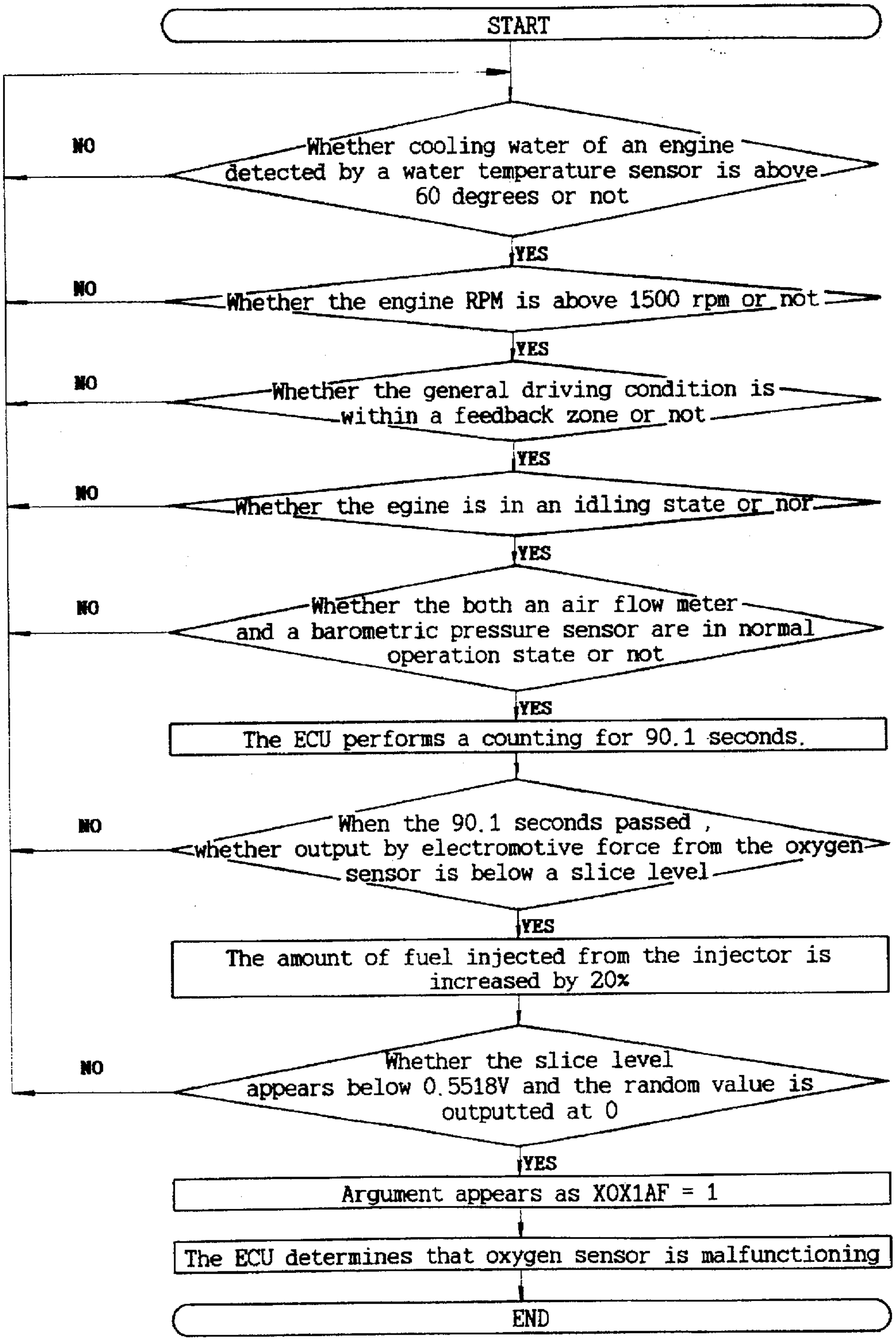
FIG. 2 is a flow chart illustrating an inactive-state determining method of an oxygen sensor in accordance with a preferred embodiment of the present invention.

Referring to FIG. 2 illustrating an inactive-state determining method of an oxygen sensor in accordance with a preferred embodiment of the present invention, an electronic control unit(ECU) first determines whether cooling water of an engine detected by a water temperature sensor is above 60 degrees or not.

Then, if the water temperature is above 60 degrees, it is determined whether the engine RPM detected by an engine RPM sensor is above 1500 RPM or not.

The 60 degrees and the 1500 RPM are the minimum reference values for activating the oxygen sensor. Since the oxygen sensor is apt to be inactivated at below the reference values, it is meaningless to determine whether the oxygen sensor is activated or not.

Next, the ECU determines whether the general driving condition is within a feedback zone, where the driving condition can be fed back as information of the oxygen sensor, or not. For example, if a high load is applied on the engine, it is not necessary to perform the feedback step.

If the driving condition is within the feedback zone, the ECU determines whether the engine is in an idling state or not. Since the amount of fuel is not controlled with the stoichiometric ratio in a state where the accelerator and the brake do not operate, the determination of whether the oxygen sensor is in the inactive-state or not can be precisely performed only in a state where the engine is in the idling state.

If the engine is in an idling state, the ECU determines whether both an air flow meter and a barometric pressure sensor are in normal operation states or not. This step is not a necessary condition for determining the inactive-state of the oxygen sensor but a step which is performed before reading the information of the oxygen sensor so as to determine the amount of fuel injected from an injector.

When both the flow meter and the barometric pressure sensor are in normal operation states, the ECU performs a counting for 90.1 seconds. Although the oxygen sensor may be activated within 30 seconds or above 50 seconds, the time of 90.1 seconds is a critical time, within which the oxygen sensor should be activated, obtained through several tests.

Next, when the critical time is passed, the ECU determines whether output by electromotive force from the oxygen sensor is below a slice level. In this embodiment, the slice level is set at 0.5518V, and an argument, which determines the oxygen sensor is activated or not, is set at a random value. Therefore, when the random value becomes 0, this indicates that the output is below the slice level.

When the output is below the slice level, that is, the random value becomes 0, the amount of fuel injected from the injector is increased by 20%. The increase in the amount of 20% allows the oxygen sensor to be sufficiently activated.

As a result, the air-fuel ratio is to be rich such that the presence of HC and CO among the exhaust gas is increased and CO and HC are oxidized at the exterior of the oxygen sensor, thereby reducing the amount of oxygen and increasing the electromotive force of the oxygen sensor. However, when the oxygen sensor malfunctions, the slice level appears below 0.5518V and the random value is outputted at 0.

Accordingly, in this case, the ECU determines that the oxygen sensor is malfunctioning and injects through the injector fuel with a predetermined value in accordance with information from the barometric pressure sensor, the air flow meter, and the RPM sensor.

At this point, argument, which indicates that the oxygen sensor malfunctions, appears as XOXIAF=1.

While this invention has been described in connection with what is presently considered to be the most practical and preferred embodiment, it is to be understood that the invention is not limited to the disclosed embodiment, but, on the contrary, it is intended to cover various modifications and equivalent methods included within the spirit and scope of the appended claims.

What is claimed is:

1. An inactive-state determining method of an oxygen sensor, comprising the steps of;

determining whether the oxygen sensor is in a condition where the oxygen sensor can be activated;

determining whether an engine is in an idle state;

counting a predetermined time;

determining whether electromotive force from the oxygen sensor is below a slice level even after the predetermined time is passed;

injecting an amount of fuel increased by 20%; and determining whether the electromotive force of the oxygen sensor is below the slice level even when the increased fuel is injected.

2. An inactive-state determining method according to claim 1, wherein the step of determining whether the oxygen sensor is in a condition where the oxygen sensor can be activated comprises the steps of determining whether the temperature of cooling water of an engine is above a predetermined value, and determining whether an engine RPM is above a predetermined value.

3. An inactive-state determining method according to claim 2, wherein the predetermined value of the temperature of the cooling water is about 60 degrees.

4. An inactive-state determining method according to claim 2, wherein the predetermined value of the engine RPM is about 1500 RPM.

5. An inactive-state determining method according to claim 1, wherein the counting time is about 90.1 seconds.

6. An inactive-state determining method according to claim 1, wherein the slice level is about 0.5518V.

* * * * *